US011278177B2

(12) United States Patent
Lin et al.

(10) Patent No.: US 11,278,177 B2
(45) Date of Patent: Mar. 22, 2022

(54) CLEANING CONTROL METHOD AND DEVICE FOR CLEANING ROBOT, AND CLEANING ROBOT

(71) Applicant: MIDEA ROBOZONE TECHNOLOGY CO., LTD., Suzhou (CN)

(72) Inventors: Zhouxiong Lin, Suzhou (CN); Zexuan Fan, Suzhou (CN); Ke Li, Suzhou (CN); Cong Hou, Suzhou (CN); Chun Luan, Suzhou (CN)

(*) Notice: Subject to any disclaimer, the term of this patent is extended or adjusted under 35 U.S.C. 154(b) by 355 days.

(21) Appl. No.: 16/702,488

(22) Filed: Dec. 3, 2019

(65) Prior Publication Data

US 2020/0178750 A1 Jun. 11, 2020

(30) Foreign Application Priority Data

Dec. 7, 2018 (CN) .......................... 201811495567.5

(51) Int. Cl.
*A47L 11/40* (2006.01)
*A47L 9/28* (2006.01)
*G05D 1/02* (2020.01)

(52) U.S. Cl.
CPC ......... *A47L 11/4061* (2013.01); *A47L 9/2852* (2013.01); *A47L 9/2894* (2013.01);
(Continued)

(58) Field of Classification Search
CPC .. A47L 11/4061; A47L 9/2852; A47L 9/2894; A47L 11/4011; A47L 2201/04;
(Continued)

(56) References Cited

U.S. PATENT DOCUMENTS 9,078,153 B1 * 7/2015 Schelstraete ......... H04B 7/0617
9,119,236 B1 * 8/2015 Martin ................ H04L 41/0803
(Continued)

FOREIGN PATENT DOCUMENTS

CN 103376801 A 10/2013
CN 106073630 A 11/2016
(Continued)

OTHER PUBLICATIONS

The first OA for CN application No. 201811495567.5.
Search Report for EP application 19214005.1.
OA for EP application 19214005.1.

*Primary Examiner* — Bhavesh V Amin
(74) *Attorney, Agent, or Firm* — Kilpatrick Townsend & Stockton, LLP

(57) ABSTRACT

Provided are cleaning control method and device for a cleaning robot, a cleaning robot, an electronic device and a non-transitory computer readable storage medium. The method includes: controlling the cleaning robot to proceed and triggering a collision detector disposed at the cleaning robot to emit a trigger signal; controlling the cleaning robot to recede a first distance according to the trigger signal; controlling the cleaning robot to rotate in place, and a proceeding direction of the cleaning robot is in parallel with a contour line of an obstacle or a tangent thereof; and controlling the cleaning robot to proceed according to the proceeding direction, and controlling a distance between the cleaning robot and the obstacle to be maintained within a pre-set distance range during proceeding.

21 Claims, 8 Drawing Sheets

(52) U.S. Cl.
CPC ........ *A47L 11/4011* (2013.01); *G05D 1/0238* (2013.01); *G05D 1/0242* (2013.01); *G05D 1/0255* (2013.01); *A47L 2201/04* (2013.01); *G05D 2201/0203* (2013.01)

(58) Field of Classification Search
CPC .... A47L 11/24; G05D 1/0238; G05D 1/0242; G05D 1/0255; G05D 2201/0203; G05D 1/0219; G05D 1/0227
See application file for complete search history.

(56) References Cited

U.S. PATENT DOCUMENTS

| | | | |
|---|---|---|---|
| 9,785,148 B2* | 10/2017 | Yun | A47L 11/4011 |
| 10,374,863 B2* | 8/2019 | Xu | A61B 5/113 |
| 10,397,039 B2* | 8/2019 | Zhang | H04B 17/309 |
| 11,050,750 B2* | 6/2021 | Fang | H04L 63/0884 |
| 2007/0234492 A1 | 10/2007 | Svendsen et al. | |
| 2012/0065829 A1 | 3/2012 | Yu et al. | |
| 2012/0077468 A1* | 3/2012 | Fan | G07C 9/00857 |
| | | | 455/414.1 |
| 2012/0232696 A1 | 9/2012 | Tang | |
| 2014/0266669 A1* | 9/2014 | Fadell | H05B 47/115 |
| | | | 340/501 |
| 2015/0163121 A1* | 6/2015 | Mahaffey | H04W 12/12 |
| | | | 707/687 |
| 2015/0256379 A1* | 9/2015 | Dhayni | H04L 25/03159 |
| | | | 375/348 |
| 2016/0018508 A1* | 1/2016 | Chen | G01S 5/0252 |
| | | | 455/456.1 |
| 2017/0212210 A1* | 7/2017 | Chen | G01S 5/0226 |
| 2018/0183650 A1* | 6/2018 | Zhang | G01S 13/003 |
| 2018/0306609 A1* | 10/2018 | Agarwal | H04W 4/38 |
| 2018/0351775 A1* | 12/2018 | Zhang | G08B 13/181 |
| 2018/0357542 A1* | 12/2018 | Wu | G06N 5/003 |
| 2018/0365975 A1* | 12/2018 | Xu | G01V 3/12 |
| 2019/0007256 A1* | 1/2019 | Chen | H04L 5/0048 |
| 2019/0028320 A1* | 1/2019 | Xu | H04L 5/0057 |
| 2019/0097865 A1* | 3/2019 | Xu | A61B 5/4809 |
| 2019/0158340 A1* | 5/2019 | Zhang | H04B 17/318 |

FOREIGN PATENT DOCUMENTS

| | | |
|---|---|---|
| CN | 106575123 A | 4/2017 |
| CN | 107544524 A | 1/2018 |
| CN | 107817800 A | 3/2018 |
| CN | 107831766 A | 3/2018 |

* cited by examiner

CLEANING CONTROL METHOD AND DEVICE FOR CLEANING ROBOT, AND CLEANING ROBOT

CROSS-REFERENCES TO RELATED APPLICATIONS

The present application is based on and claims priority to Chinese patent application number 201811495567.5, filed on Dec. 7, 2018, the entire disclosure of which is hereby incorporated by reference.

FIELD

The present disclosure relates to a field of intelligent household electrical appliances, and particular to a cleaning control method for a cleaning robot, a cleaning control device for a cleaning robot, a cleaning robot, an electronic device and a non-transitory computer readable storage medium.

BACKGROUND

Currently, for most existing cleaning robots, with a cycle of colliding with an obstacle, adjusting a proceeding angle, colliding with another obstacle, adjusting a proceeding angel again and so on, a proceeding direction of the cleaning robot is in parallel with a contour line of an obstacle or a tangent thereof, to realize cleaning along obstacle contour line. Such a method with multiple collisions not only reduces the cleaning efficiency, but also negatively affects the intelligence of the cleaning robot. In addition, the body of the cleaning robot constantly hits obstacles, which may cause damage to the obstacles such as furniture and walls, thus negatively affect user experience.

SUMMARY

The present disclosure seeks to solve at least one of the problems that exist in the related art to at least some extent.

Accordingly, one embodiment of the present disclosure is to provide a cleaning control method for a cleaning robot, by controlling the cleaning robot to recede a distance after one collision with an obstacle for one time, adjusting the cleaning robot to rotate so that a proceeding direction of the cleaning robot is in parallel with a contour line of the obstacle or a tangent thereof, and maintaining a distance between the cleaning robot and the obstacle during proceeding, the number of collisions of the cleaning robot with the obstacle during working is reduced, and an efficient and automatic function of cleaning along contour line is realized for the cleaning robot, thus improving the cleaning control method for the cleaning robot.

Another one embodiment of the present disclosure is to provide a cleaning control method for a cleaning robot.

Still another one embodiment of the present disclosure is to provide a cleaning robot.

A further one embodiment of the present disclosure is to provide an electronic device.

A further one embodiment of the present disclosure is to provide a non-transitory computer readable storage medium.

Embodiments of the present disclosure provides a cleaning control method for a cleaning robot. The method includes:

controlling the cleaning robot to proceed and triggering a collision detector disposed at the cleaning robot to emit a trigger signal;

controlling the cleaning robot to recede a first distance according to the trigger signal;

controlling the cleaning robot to rotate in place so that a proceeding direction of the cleaning robot is in parallel with a contour line of an obstacle or a tangent thereof; and controlling the cleaning robot to proceed according to the proceeding direction, and controlling a distance between the cleaning robot and the obstacle to be maintained within a pre-set distance range during proceeding.

Embodiments of the present disclosure provides a cleaning control device for a cleaning robot. The cleaning robot is provided with a collision detector configured to detect an obstacle and connected to the cleaning control device. The cleaning control device includes:

a collision detection module, configured to control the cleaning robot to proceed and trigger the collision detector disposed at the cleaning robot to emit a trigger signal;

a receding control module, configured to control the cleaning robot to recede a first distance according to the trigger signal;

a rotation control module, configured to control the cleaning robot to rotate in place so that a proceeding direction of the cleaning robot is in parallel with a contour line of an obstacle or a tangent thereof; and a proceeding control module, configured to control the cleaning robot to proceed according to the proceeding direction, and control a distance between the cleaning robot and the obstacle to be maintained within a pre-set distance range during proceeding.

With the cleaning control device for a cleaning robot provided in the embodiments of the second aspect of the present disclosure, by controlling the cleaning robot to recede a distance after one collision with the obstacle, adjusting the cleaning robot to rotate so that the proceeding direction of the cleaning robot is in parallel with the contour line of the obstacle or a tangent thereof, and maintaining the distance between the cleaning robot and the obstacle during proceeding, the number of collisions of the cleaning robot with the obstacle during working is reduced, and an efficient and automatic function of cleaning along contour line is realized for the cleaning robot, thus improving the cleaning control method for the cleaning robot.

Embodiments of the present disclosure provides in a cleaning robot. A collision detector is disposed at the cleaning robot and configured to detect an obstacle. The cleaning robot further includes a cleaning control device as described in the embodiments of the second aspect of the present disclosure, which is connected to the collision detector.

With the cleaning robot provided in the embodiments of the third aspect of the present disclosure, by controlling the cleaning robot to recede a distance after one collision with the obstacle, adjusting the cleaning robot to rotate so that the proceeding direction of the cleaning robot is in parallel with the contour line of the obstacle or a tangent thereof, and maintaining the distance between the cleaning robot and the obstacle during proceeding, the number of collisions of the cleaning robot with the obstacle during working is reduced, and an efficient and automatic function of cleaning along contour line is realized for the cleaning robot, thus improving the cleaning control method for the cleaning robot.

Embodiments of the present disclosure provides an electronic device, including: a memory, a processor; where the processor reads an executable program code stored in the memory to execute a program corresponding to the executable program code, to perform a cleaning control method for a cleaning robot as described in the embodiments of the first aspect of the present disclosure.

Embodiments of the present disclosure provides a non-transitory computer readable storage medium having stored therein a computer program that, when executed by a processor, causes the processor to perform a cleaning control method for a cleaning robot as described in the embodiments of the first aspect of the present disclosure.

BRIEF DESCRIPTION OF THE DRAWINGS

Embodiments of the present disclosure will become apparent and more readily appreciated from the following descriptions made with reference to the drawings, in which.

DETAILED DESCRIPTION OF THE DISCLOSURE

Exemplary embodiments will be described in detail herein, and examples thereof are illustrated in accompanying drawings. Throughout figures referred by the following description, the same reference number in different figures indicates the same or similar elements. The embodiments described herein with reference to drawings are explanatory, and used to generally describe the present disclosure, which shall not be construed to limit the present disclosure.

A cleaning control method for a cleaning robot, a cleaning control device for a cleaning robot, a cleaning robot, an electronic device and a non-transitory computer readable storage medium according to embodiments of the present disclosure are described below with reference to the drawings.

Figure 1:
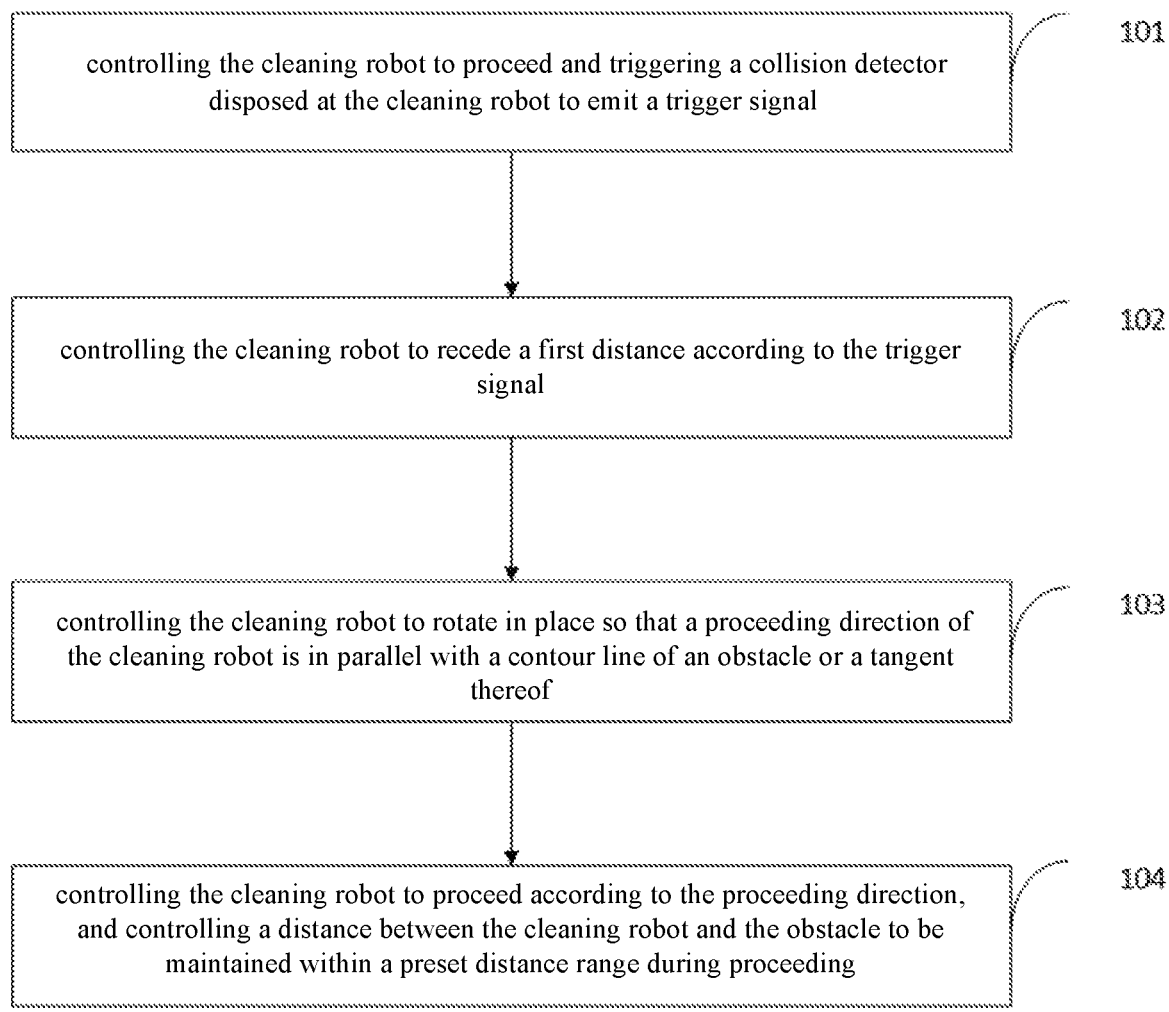
FIG. 1 is a flow chart of a cleaning control method for a cleaning robot according to an embodiment of the present disclosure.
Figure 2:
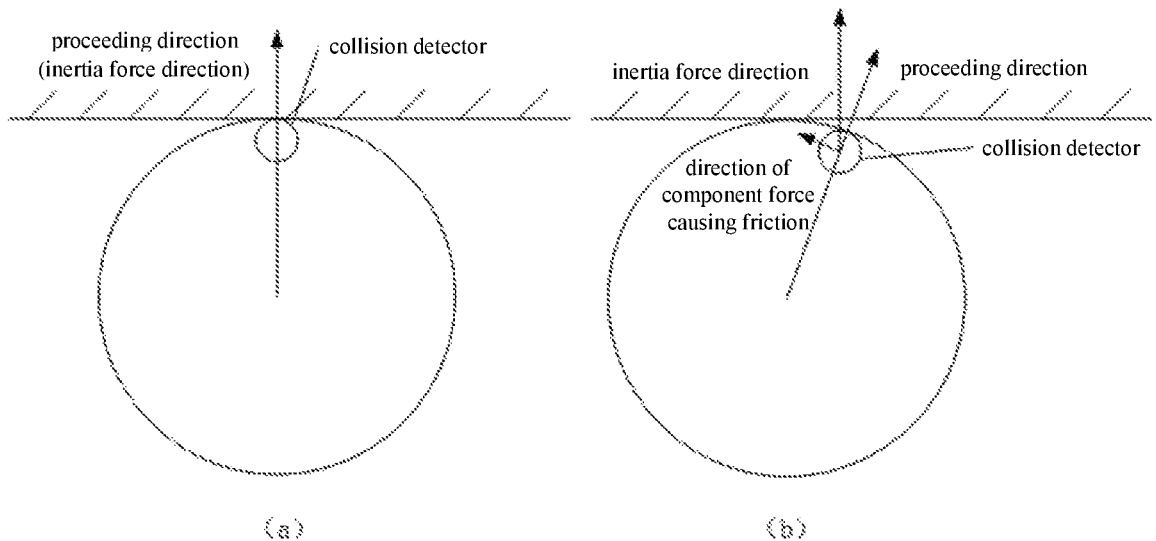
FIG. 2 is a schematic diagram showing a relationship between a collision strength of a collision detector, which is actually detected, and a distance between a collision point and the collision detector according to an embodiment of the present disclosure.

FIG. 1 is a flow chart of a cleaning control method for a cleaning robot according to an embodiment of the present disclosure. As shown in FIG. 1, the method includes following steps.

In block 101, the cleaning robot is controlled to proceed and a collision detector disposed at the cleaning robot is triggered to emit a trigger signal.

In an embodiment of the present disclosure, the cleaning robot is provided with the collision detector. During proceeding, an obstacle may be detected by the collision detector. Once collided with the obstacle, the collision detector may produce the trigger signal, to inform the cleaning robot of collision occurrence by the trigger signal.

In an embodiment of the present disclosure, the cleaning root is provided with a plurality of collision detectors. A collision strength threshold may be pre-set, and when a collision strength of the collision detector is greater than the threshold, it can be determined that the cleaning robot collides with the obstacle. With such a threshold, data detected by various detectors may be distinguished from each other.

Figure 3:
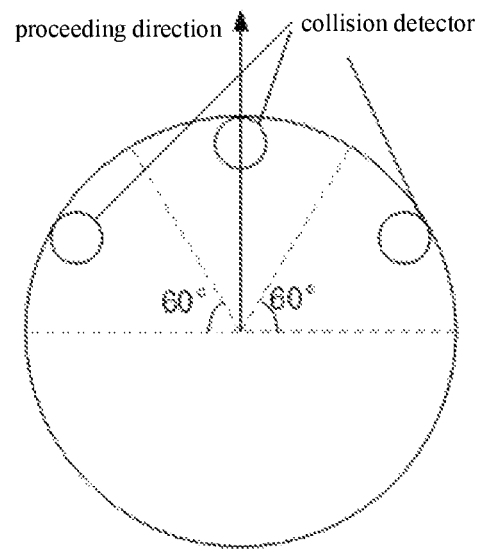
FIG. 3 is a schematic diagram illustrating a collision detection of a cleaning robot according to an embodiment of the present disclosure.

Considering the cost, three collision detectors are generally arranged on the cleaning robot. Detection capabilities of the three collision detectors may be identical. Since the collision detector needs to collide with the obstacle to detect data, as shown in FIG. 3, the collision detectors should be disposed at a sector of 180°, i.e., a forward half circle, of the cleaning robot. The sector may be equally divided into three small sectors, and each has an angle of 60°. Each of the three collision detectors is located at a midpoint of an arc of a small sector. Since the detection capabilities of the collision detectors are exactly the same, if a collision occurs at a junction of any two small sectors, the two collision strengths of the two collision detectors disposed at the two small sectors are the same. The further a collision point is from the collision detector, the smaller the collision strength is. It can be known that if a collision strength in each small sector is detected by the corresponding collision detection in such a small sector, the junction of two small sectors is a collision point with a minimum collision strength. On this basis, the collision strength threshold can be pre-set to be slightly smaller than the collision strength at the junction. According to such a threshold, when the cleaning robot collides with the obstacle, there is always one collision strength of the collision detector in the small sector greater than the threshold, so that the cleaning robot simultaneously identify this collision detector that has detected the obstacle, and thus the collision detectors of the cleaning robot can realize regional detection for the obstacles in front, facilitating determining a rotation direction for a subsequent process. A value of the threshold varies with the angle of the small sector, and the angle of the small sector is related to the number of collision detectors. Therefore, the collision strength threshold should be changed according to the number of collision detectors disposed at the cleaning robot.

According to a proceeding direction of the cleaning robot with respect to the obstacle, in different cases, the cleaning robot may have a variety of collision detector arrangements as follows.

Figure 4:
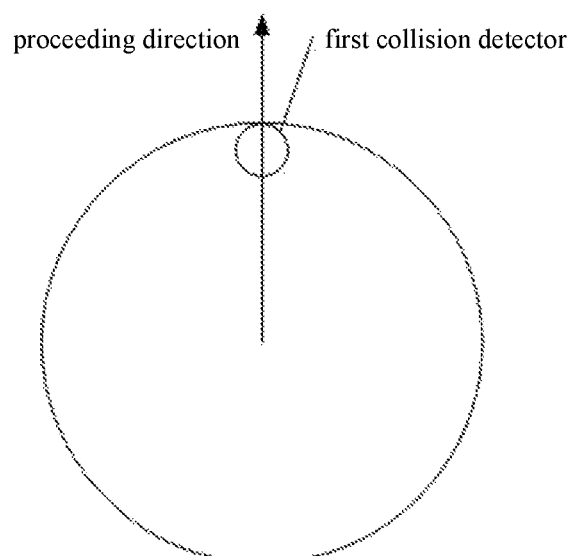
FIG. 4 is a schematic diagram of a cleaning robot provided with only a first collision detector according to an embodiment of the present disclosure.

In one embodiment, the collision detector disposed at the cleaning robot may include a first collision detector. As shown in FIG. 4, an obstacle detection function of the cleaning robot can be realized by the first collision detector only. In one embodiment, the first collision detector is disposed at a foremost end of the cleaning robot. When an obstacle collides with the cleaning robot at the foremost end of the cleaning robot, a collision strength detected by the collision detector is greater than the pre-set collision strength threshold, so that the cleaning robot determines that it did collide with the obstacle, thus realizing the collision detection of the obstacles in front of the cleaning robot.

Further, at a normal proceeding speed of the cleaning robot, two points at the sectors having an angle of 90° with respect to the first collision detector may be a place where collision with an obstacle happens, and an collision strength of such the points may be measured (ideally, but acquired by an approximation method actually) and pre-set as the collision strength threshold, so that the full detection for the obstacles may be realized by the first collision detector only. Although only one collision detector can greatly reduce the product cost, an inertial force generated by the collision of the point at an angle of 90° with respect to the collision detector almost all corresponds to a frictional force. In this case the actual measured collision strength at that point is extremely small, so that a braking deceleration when the cleaning robot is actively braking is extremely small, which is very difficult to implement and thus may not meet the actual use requirements.

Figure 5:
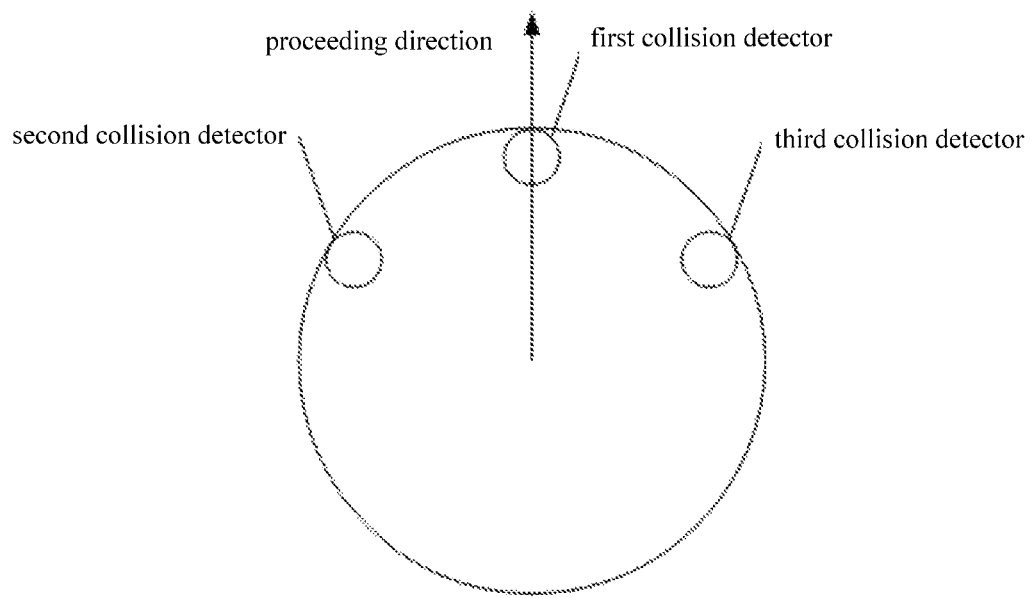
FIG. 5 is a schematic diagram of a cleaning robot provided with a first collision detector, a second collision detector and a third collision detector according to an embodiment of the present disclosure.

Further, the collision detector disposed at the cleaning robot should include a second collision detector and a third collision detector, as shown in FIG. 5. Referring to FIG. 3 and above description, each detector detects collisions happened in its own region without interferences to each other, thus realizing the collision detection of the obstacles in the proceeding direction of the cleaning robot.

Figure 6:
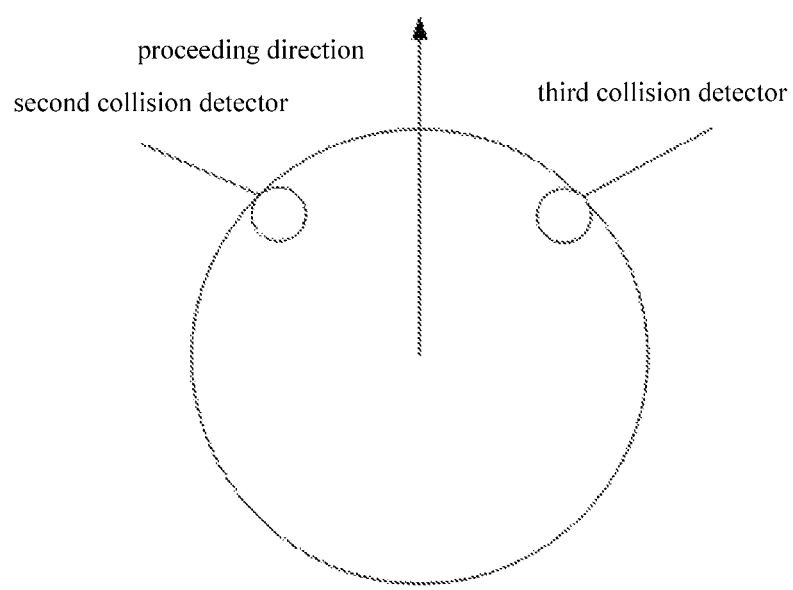
FIG. 6 is a schematic diagram of a cleaning robot provided with only a second collision detector and a third collision detector according to an embodiment of the present disclosure.
Figure 7:
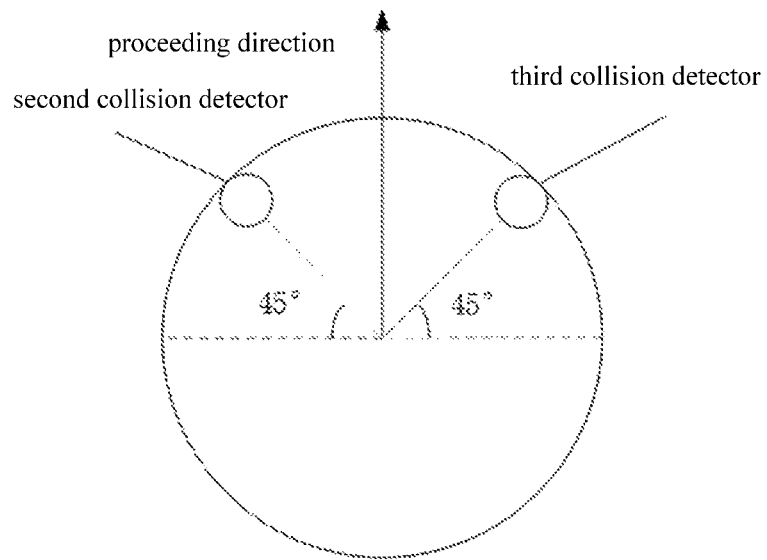
FIG. 7 is a schematic diagram illustrating a collision detection of a cleaning robot according to another embodiment of the present disclosure.

In one embodiment, the collision detector disposed at the cleaning robot may include a second collision detector and a third collision detector only, as shown in FIG. 6. In one embodiment, the second collision detector and the third collision detector are symmetrically disposed at two sides of a body of the cleaning robot, as shown in FIG. 7. The forward half circle of 180° may be equally divided into two small sectors and each collision detector is located at a midpoint of an arc of a small sector. A minimum collision strength is the collision strength detected by the collision detector at a junction of the two sectors and two end points of the two sectors. On this basis, the collision strength threshold can be pre-set to be slightly smaller than the minimum collision strength actually detected, thus realizing the collision detection of the obstacles in the proceeding direction of the cleaning robot.

In block 102, the cleaning robot is controlled to recede a first distance according to the trigger signal.

In the embodiment of the present disclosure, after receiving the trigger signal from the obstacle detector, the cleaning robot determines that the collision has happened. At this time, the cleaning robot is controlled to recede the first distance. In one embodiment, the first distance of the receding is adaptively changed as a relative position of the cleaning robot away from the obstacle is changed, which is described as follows.

Figure 8:
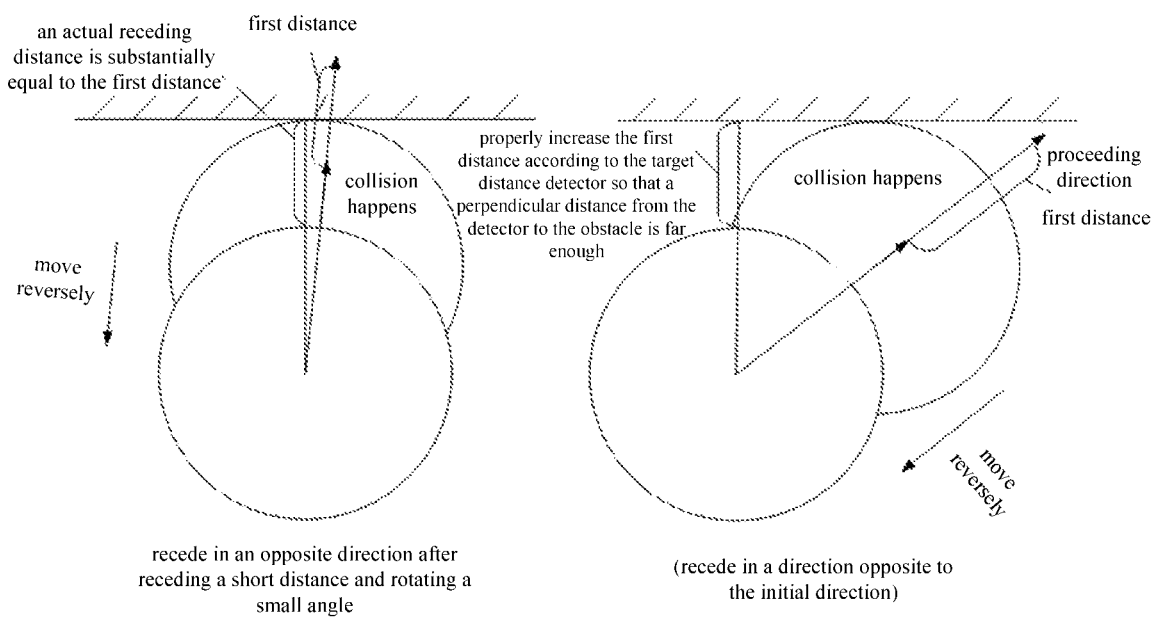
FIG. 8 is a schematic diagram showing two situations in which a cleaning robot recedes after collision according to an embodiment of the present disclosure.

As shown in FIG. 8, if the collision detector for detecting a collision is the first collision detector disposed at the foremost end of the cleaning robot, when the cleaning robot collides with the obstacle in a proceeding direction as shown in the figure, it may recede the pre-set first distance along the proceeding direction, and in this case a distance between a collision point and the obstacle is substantially the first distance.

If the collision detector that has been hit is not the collision detector at the foremost end, a relative position of the obstacle may be determined according to a target collision detector (at the left side or right side) that has been detected to be collided with, so that a corresponding first distance that the cleaning robot receding is acquired, and at this time the first distance is not equal to the first distance that the cleaning robot recedes when the collision happens at the foremost end. In this case, the receding distance may be properly increased to ensure the distance between the cleaning robot and the obstacle.

In block 103, the cleaning robot is controlled to rotate in place so that a proceeding direction of the cleaning robot is in parallel with a contour line of an obstacle or a tangent thereof.

In an embodiment of the present disclosure, after the cleaning robot is controlled to recede the first distance as described above, the cleaning robot is stopped at a distance from the obstacle. After that, the cleaning robot rotates in place until the proceeding direction of the cleaning robot is in parallel with the contour line of the obstacle or the tangent thereof as long as the distance between the cleaning robot and the obstacle is remained the same, so that the cleaning robot may realize cleaning along contour line in the following cleaning process.

Figure 9:
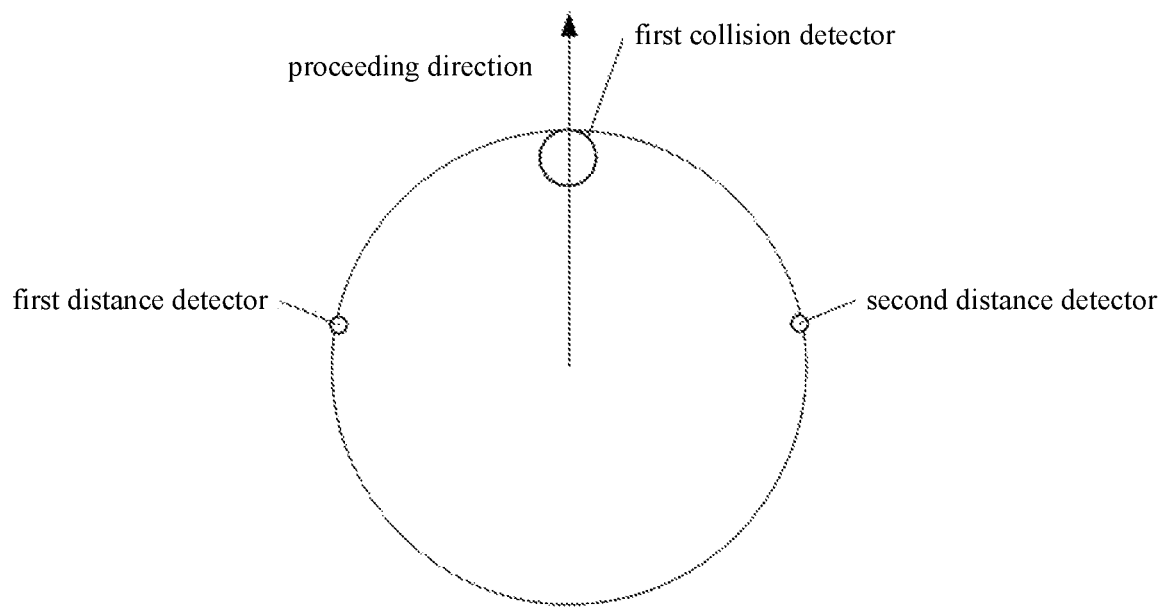
FIG. 9 is a schematic diagram of a cleaning robot provided with a collision detector and a distance detector according to an embodiment of the present disclosure.

In one embodiment, when the collision detector only includes the first collision detector, the cleaning robot is further provided with a first distance detector and a second distance detector symmetrically at two sides of the cleaning robot, as shown in FIG. 9. In this case, the cleaning robot is controlled to rotate in place. In one embodiment, the cleaning robot is controlled to take a current position (i.e., a position the cleaning robot stops when the first distance is reached) as an initial position and to rotate in place according to a pre-set direction. The pre-set direction includes a counter-clockwise direction and a clockwise direction. The cleaning robot may substantially determine the relative position of the obstacle with respect to the cleaning robot with the first and second distance detectors, and select a rotation direction according to the relative position. For example, if the obstacle is substantially positioned in front and left of the cleaning robot, the cleaning robot rotates clockwise, if the obstacle is substantially positioned in front and right of the cleaning robot, the cleaning robot rotates counter-clockwise, and if the obstacle is perpendicular to the proceeding direction of the cleaning robot, the cleaning robot may select both the clockwise direction and the counter-clockwise direction, thus minimizing an angular displacement of the rotation which is performed by the cleaning robot to ensure the proceeding direction of the cleaning robot is in parallel with the contour line of the obstacle or the tangent thereof.

Figure 10:
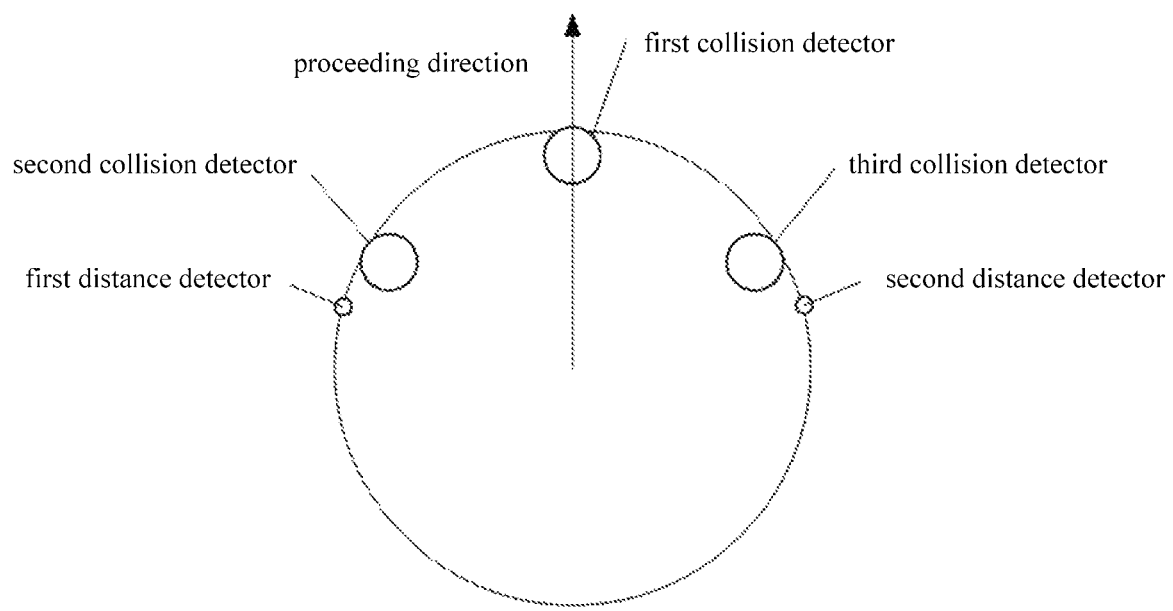
FIG. 10 is a schematic diagram of a cleaning robot provided with a collision detector and a distance detector according to another embodiment of the present disclosure.

In one embodiment, the collision detector further includes a second collision detector and a third collision detector, which are disposed symmetrically at the two sides of the cleaning robot. FIG. 3 shows a feasible arrangement of the collision detectors. The first distance detector and the second collision detector are disposed at one side of the cleaning robot, and the second distance detector and the third collision detector are disposed at the other side of the cleaning robot. As shown in FIG. 10, at this time the cleaning robot is controlled to rotate in place. In one embodiment, based on that the detection of collisions in different regions of the cleaning robot is realized by the above collision detectors, a target collision detector that detection data belongs to can be identified, in this case the target collision detector may be any one of the first collision detector, the second collision detector and the third collision detector. After the target collision detector is determined, a rotation direction of the cleaning robot may be determined according to the target collision detector. For example, when the target collision detector is the second collision detector, as the second collision detector is disposed at the front and left part of the cleaning robot, it can be determined that the obstacle is also in front and left of the cleaning robot, and the cleaning robot rotates in place clockwise. When the target collision detector is the third collision detector, as the third collision detector is disposed at the front and right part of the cleaning robot, it can be determined that the obstacle is also in front and right of the cleaning robot, and the cleaning robot rotates in place counter-clockwise. After the cleaning robot starts rotation, a distance detector disposed at the same side of the cleaning robot as the target collision detector is controlled to be turned on, to detect a distance between the cleaning robot and the obstacle during rotation of the cleaning robot.

Figure 11:
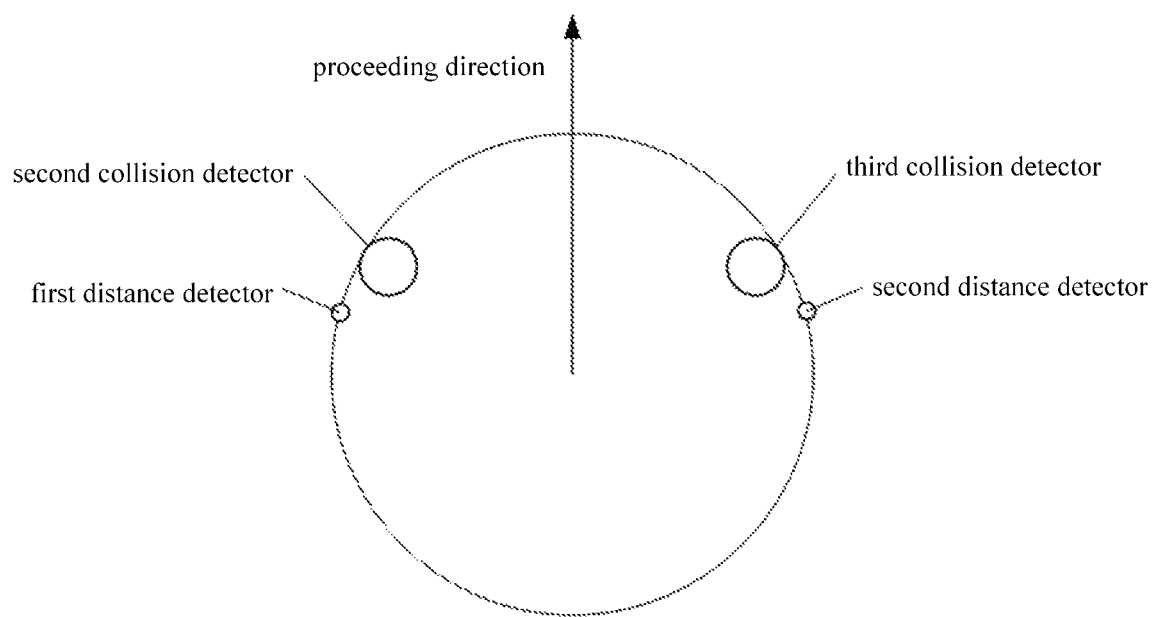
FIG. 11 is a schematic diagram of a cleaning robot provided with a collision detector and a distance detector according to still another embodiment of the present disclosure.

Further, it is also possible that the collision detector only includes a second collision detector and a third collision detector, which are disposed symmetrically at the two sides of the cleaning robot. FIG. 7 shows a feasible arrangement of the collision detectors. The first distance detector and the second collision detector are disposed at one side of the cleaning robot, and the second distance detector and the third collision detector are disposed at the other side of the cleaning robot. As shown in FIG. 11, in this case the cleaning robot is controlled to rotate in place. In one embodiment, based on that the detection of collisions in different regions of the cleaning robot is realized by the above collision detectors, a target collision detector that detection data belongs to can be identified, in this case the target collision detector may be the second collision detector or the third collision detector. After the target collision detector is determined, a rotation direction of the cleaning robot may be determined according to the target collision detector. For example, when the target collision detector is the second collision detector, as the second collision detector is disposed at the front and left part of the cleaning robot, it can be determined that the obstacle is also in front and left of the cleaning robot, and the cleaning robot rotates in place clockwise. When the target collision detector is the third collision detector, as the third collision detector is disposed at the front and right part of the cleaning robot, it can be determined that the obstacle is also in front and right of the cleaning robot, and the cleaning robot rotates in place counter-clockwise.

After the cleaning robot starts rotation, a distance detector disposed at the same side of the cleaning robot as the target collision detector is controlled to be turned on, which is referred as a target distance detector herein. The target distance detector detects a distance between the cleaning robot and the obstacle during rotation of the cleaning robot, i.e., a second distance, in real time. The second distance changes as the cleaning robot rotates in place, and then, the cleaning robot can be controlled to rotate in place so that the proceeding direction of the cleaning robot is in parallel with the contour line of the obstacle or the tangent thereof according to a changing trend of the second distance during the rotation, which will be described in details hereinafter and thus is not described here.

In block 104, the cleaning robot is controlled to proceed according to the proceeding direction, and maintain a distance between the cleaning robot and the obstacle within a pre-set distance range during proceeding.

After the cleaning robot rotates in place so that the proceeding direction of the cleaning robot is in parallel with the contour line of the obstacle or the tangent thereof, the cleaning robot proceeds in the current direction and starts to clean along the counter line of the obstacle. Moreover, during the cleaning, the distance between the cleaning robot and the obstacle is detected by the distance detector in real time. Further, if the proceeding deviation of the cleaning robot is detected to be deviated, it is appropriately adjusted to ensure that the distance between the cleaning robot and the obstacle is maintained within the pre-set distance.

In one embodiment, once the proceeding direction of the cleaning robot is determined, the second distance acquired by the target distance detector is a third distance between the target distance detector and the obstacle which should be maintained during the cleaning along contour line. The third distance is a fixed value. In one embodiment, the target distance detector is one of the first distance detector and the second distance detector, i.e., the distance detector that is kept working during the rotation of the cleaning robot.

Further, when the cleaning robot proceeds along the contour line, the target distance detector detects the distance between itself and the obstacle in real time, and adjust the proceeding direction of the cleaning robot in real time according to the currently detected distance between the cleaning robot and the obstacle, so that the distance between the cleaning robot and the obstacle is maintained within a range.

In an embodiment, the distance range that is maintained during the cleaning along the contour line includes the third distance. In one embodiment, the cleaning robot starts the contour line cleaning at a third distance from the obstacle. Due to a poor road surface condition, a driving wheel of the cleaning robot may be not calibrated enough to get a right place or the cleaning robot may not rotate in place so that the proceeding direction of the cleaning robot is in parallel with the contour line of the obstacle or the tangent thereof, and thus the cleaning robot may deviate from a pre-set proceeding direction (in parallel with the contour line of the obstacle or the tangent thereof and maintains a third distance from the obstacle). On this basis, the distance between the cleaning robot and the obstacle may be changed, so that the cleaning robot may not be able to perform cleaning along the contour line of the obstacle, or it may approach the obstacle and collides with the obstacle. At this time, by analyzing distance information detected by the distance detector on the cleaning robot, the proceeding direction of the cleaning robot is adjusted, so that the cleaning robot returns to the pre-set proceeding direction. After the cleaning robot deviates from the pre-set proceeding direction, it will return to a position at the third distance from the obstacle through corresponding adjustments, which can be regarded as that the cleaning robot deviates from the pre-set proceeding direction to make an arc movement but finally returns back to the pre-set proceeding direction during proceeding. In the deviating and returning process, the farthest deviated distance is a distance from an apex of the arc of the movement of the cleaning robot to the pre-set proceeding direction. When the arc is convex toward the obstacle, at the moment the cleaning robot is closest to the obstacle, the cleaning robot does not exceed the apex of the arc, and when the arc is concave toward the obstacle, at the moment the cleaning robot is closest to the obstacle, the cleaning robot still does not exceed the apex of the arc. Therefore, the distance between the cleaning robot and the obstacle is always maintained within a range during a process of proceeding while adjusting the proceeding direction at the same time. Such a distance range includes the third distance. At one side of the third distance, there is a distance range of approaching the obstacle represented by a height of the arc convex toward the obstacle, and at the other side of the third distance, there is a distance range of being away from the obstacle represented by a height of the arc concave toward the obstacle, and thus the distance range of approaching the obstacle and the distance range of being away from the obstacle together constitute the proceeding distance maintained between the cleaning robot and the obstacle.

With the cleaning control method for a cleaning robot provided in the embodiments of the present disclosure, by controlling the cleaning robot to recede a distance after one collision with the obstacle, adjusting the cleaning robot to rotate so that the proceeding direction of the cleaning robot is in parallel with the contour line of the obstacle or a tangent thereof, and maintaining the distance between the cleaning robot and the obstacle during proceeding, the number of collisions of the cleaning robot with the obstacle during working is reduced, and an efficient and automatic function of cleaning along contour line is realized for the cleaning robot, thus improving the cleaning control method for the cleaning robot.

In an embodiment of the present disclosure, during the cleaning robot rotating in place, the distance detector detects the variable second distance in real time and the proceeding direction of the cleaning robot is determined according to the second distance, which includes following steps.

A minimum second distance is identified, and a first rotation angle currently required for the cleaning robot is determined according to the minimum second distance; the cleaning robot is controlled to rotate according to the first rotation angle, to obtain the proceeding direction of the cleaning robot.

Figure 12:
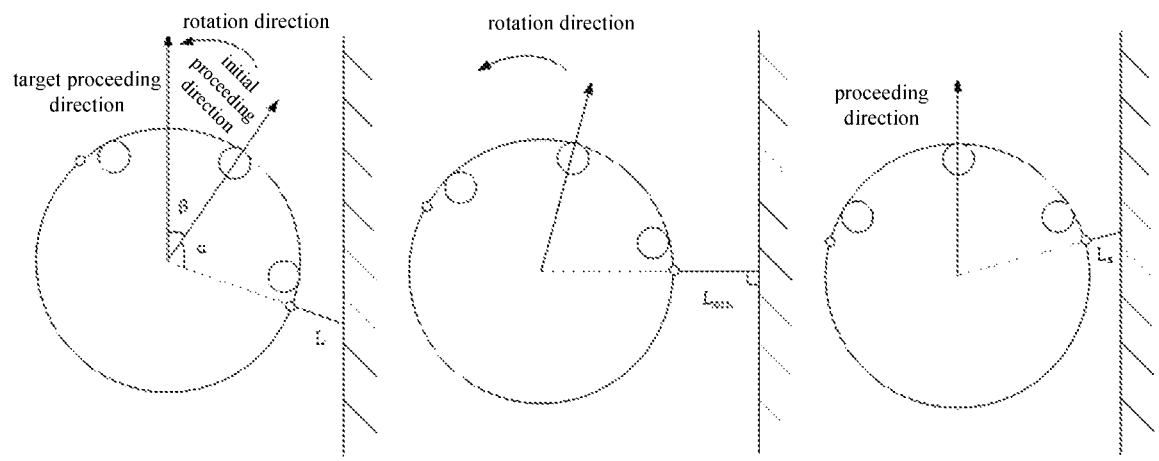
FIG. 12 is a schematic diagram showing a corresponding relationship between an in-situ rotation angle of a cleaning robot and a second distance according to an embodiment of the present disclosure.

In an example, when the cleaning robot rotates in place, the second distance is decreased first and then increased, as shown in FIG. 12. According to the changing trend of the second distance, a point where the second distance starts to increase is a minimum second distance. When the second distance is the minimum, a detection direction of the collision detector is perpendicular to the obstacle. As shown in FIG. 12, the cleaning robot rotates an angle of β in place so that the proceeding direction of the cleaning robot is in parallel with the contour line of the obstacle or the tangent thereof. In this case, angle β is the first rotation angle that the cleaning robot is required to rotate. A value of the angle β may be acquired by subtracting an angle α between the distance detector and the obstacle from a right angle, and the angle α is defined as a fixed value when a cleaning robot is designed, so that the angle β also has a fixed value which may be stored in the cleaning robot and used immediately.

Figure 13:
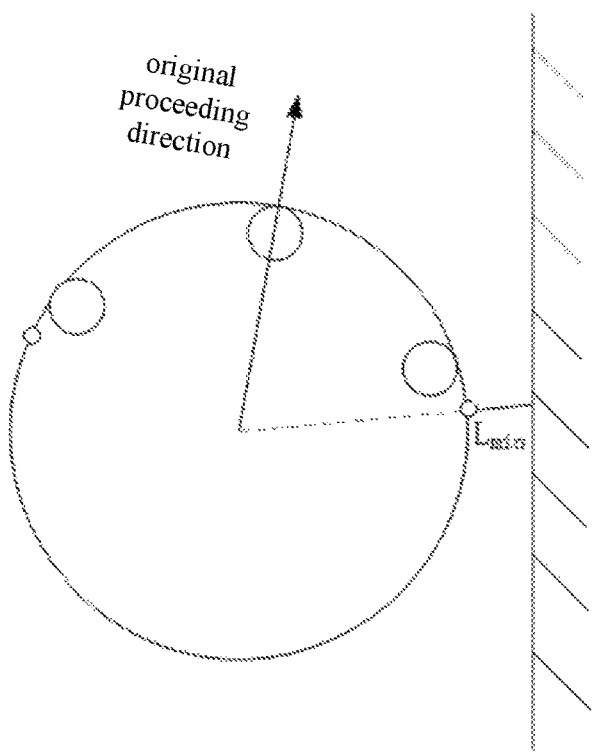
FIG. 13 is a schematic diagram showing a corresponding relationship between an in-situ rotation angle of a cleaning robot and a second distance according to another embodiment of the present disclosure.

In another example, when the cleaning robot rotates in place, the second distance is increased without being decreased, as shown in FIG. 13. At this time, a point the rotation begins is the point when the second distance is the minimum. As shown in the figure, a dotted line passing through a center point of the cleaning robot and the distance detector is perpendicular to the obstacle, and an angle between the dotted line and a solid line is γ. An angle between the proceeding direction of the cleaning robot and the detection direction of the detector is the fixed angle α as descried above. An angle θ between a current proceeding direction of the cleaning robot and the contour line of the obstacle or the tangent thereof is obtained by subtracting a sum of the angle value α and the angle γ from a right angle, and the angle θ is the first rotation angle that the cleaning robot is required to rotate in this case. The cleaning robot rotates an angle of θ to acquire the proceeding direction of the cleaning robot which is in parallel with the contour line of the obstacle or the tangent thereof. In one embodiment, as shown in FIG. 13, the solid line and the dotted line passing through the distance detector may form a right triangle with the obstacle, where a length of the dotted line is the first distance and a length of the solid line is the minimum of the second distance as described above. On this basis, the angle γ can be acquired with the Pythagorean theorem and the cosine law, and further the first rotation angle θ can be acquired.

Further, considering inertia, the distance detectors should be disposed at the two sides of the body of the cleaning robot while ensuring that the distance detectors are disposed at a position in front of a lateral center axis, that is, in the front half of the cleaning robot. In one embodiment, if the distance detector is disposed at the lateral central axis of the cleaning robot, the robot needs to rotate beyond the lateral central axis so that the second distance will be increased first and then decreased. When the inertia is considered, the proceeding direction of the cleaning robot is no longer in parallel with the contour line of the obstacle or the tangent thereof, an angle may be generated.

In an embodiment of the present disclosure, after the value of the first rotation angle is acquired, the cleaning robot is further required to rotate according to the first rotation angle, thus obtaining the proceeding direction of the cleaning robot which is the same as the contour line of the obstacle or the tangent thereof. In one embodiment, the following steps may be included.

A first time is acquired when the minimum second distance is identified; a time difference between a current time and the first time is acquired, and a second rotation angle that the cleaning robot has rotated for a time period from the first time to the current time is acquired according to the time difference and a rotation speed of the cleaning robot; and a third rotation angle remained for the cleaning robot is acquired according to the first rotation angle and the second rotation angle, and the cleaning robot is controlled to continue to rotate the third rotation angle, to obtain the proceeding direction of the cleaning robot.

In one embodiment, according to the changing trend of the second distance, an actual minimum second distance is acquired and the first time, when the minimum second distance is reached, is acquired. Meanwhile, in the actual rotation process, since a minimum second distance is identified by the distance detector when it is detected that the second distance starts to increase, in this case the cleaning robot has rotated a small angle, so that the identified minimum second distance is slightly larger than a true minimum second distance. At this time, the difference between the current time and the first time is acquired, that is, the time difference between a time when the true minimum second distance is reached and a time when the minimum second distance is detected by the cleaning robot. According to the rotation speed of the cleaning robot and the above time difference, an angel that the cleaning robot has rotated for a time period from the first time to the current time is acquired and that is the second rotation angle.

According to the first rotation angle and the second rotation angle, the third rotation angle remained for the cleaning robot is acquired and the cleaning robot is controlled to continue to rotate the third rotation angle, to obtain the proceeding direction of the cleaning robot which is in parallel with the contour line of the obstacle or the tangent thereof.

Further, in the other example as described above, i.e., the second distance is increased only, the cleaning robot determines that the starting point of the rotation is the point when the second distance is the minimum, which is the same as the true minimum, and it is not necessary to calculate the second rotation angle and the third rotation angle, and the proceeding direction of the cleaning robot may be acquired by rotating the first rotation angle immediately.

In an embodiment of the present disclosure, after the cleaning robot rotates in place to the proceeding direction, the cleaning robot starts to perform cleaning along the contour line of the obstacle. However, in actual practice, the proceeding direction of the cleaning robot may be slightly changed due to various situations, resulting in deviation from the proceeding direction and the cleaning along the contour line of the obstacle or collision with the obstacle. At this time, it is necessary to detect the change of the proceeding direction of the cleaning robot in real time according to the current distance between the cleaning robot and the obstacle, and adjust the proceeding direction once a change occurs, to return to the original proceeding direction. In one embodiment, the following steps may be included.

The current distance is compared with the third distance; if the current distance is greater than the third distance, it is determined that the proceeding direction of the cleaning robot is proceeding away from the contour line or the tangent thereof, if the current distance is smaller than the third distance, it is determined that the proceeding direction of the cleaning robot is approaching the contour line or the tangent thereof; and the cleaning robot is controlled to rotate in an inverse direction according to a difference between the current distance and the third distance.

Figure 14:
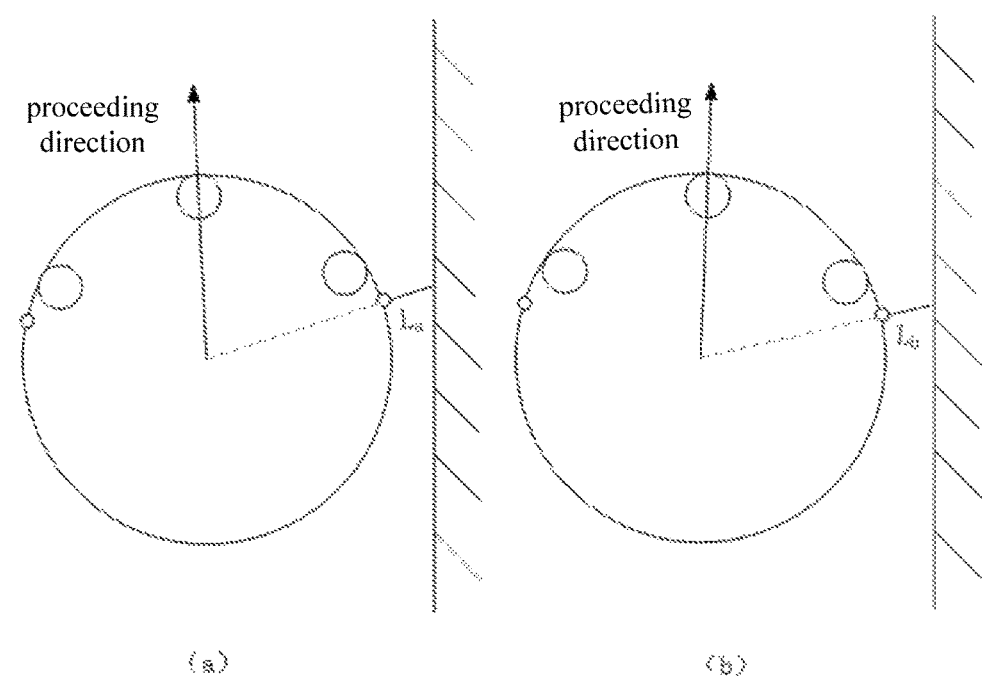
FIG. 14 is a schematic diagram of a deviation of a proceeding direction of a cleaning robot when proceeding along an obstacle according to an embodiment of the present disclosure.

In one embodiment, the current distance is compared with the third distance with reference to FIG. 14. As shown in FIG. 14(a), if the current distance $L_a$ is greater than the third distance, the cleaning robot proceeds in a direction away from the obstacle. After the cleaning robot proceeds for a while, it will be away from the wall and thus will not realize the cleaning along the counter line. As shown in FIG. 14(b), if the current distance $L_b$ is smaller than the third distance, the cleaning robot proceeds in a direction approaching the obstacle. After the cleaning robot proceeds for a while, it may collide with the obstacle.

In one embodiment, a difference between the current distance and the third distance is calculated. If the difference is positive, the cleaning robot proceeds away from the obstacle. At this time, the cleaning robot is controlled to proceed toward the obstacle. Similarly, if the difference is negative, the cleaning robot is controlled to proceed away from the obstacle. In one embodiment, an absolute value of the difference is positively correlated with a degree of reversely adjusting the proceeding direction of the cleaning robot. The larger the absolute value of the difference, the greater the deviation from the obstacle, and the greater the degree of reversely adjusting the angle of the cleaning robot. The absolute value of the difference is in one to one relationship with the degree of adjusting the proceeding direction, and such a relationship may be stored in the cleaning robot.

Further, in the actual application of the cleaning robot, an obstacle may have small concave or convex which does not affect the proceeding of the cleaning robot, but affects the detection of the distance between the current cleaning robot and the obstacle performed by the distance detector and the determination made by the cleaning robot whether the proceeding direction needs to be adjusted. At this time, a waiting time may be pre-set between a time that deviation of the distance between the cleaning robot and the obstacle is detected and a time that the cleaning robot has decided to adjust the proceeding direction (the waiting time should not be too long, and it is necessary to ensure that the cleaning robot will not hit the obstacle after proceeding for this waiting time). During the waiting time, if the distance between the two returns to the third distance or gradually close to the third distance, the cleaning robot gives up the adjustment of the proceeding direction, if the distance between the two still deviates from the third distance, the cleaning robot is controlled to adjust the proceeding direction. In this way, the cleaning robot is prevented from frequently adjusting the proceeding direction when the surface of the obstacle is uneven, thus improving the cleaning efficiency in this case.

In one embodiment, all the distance detectors mentioned above may emit a sound wave or a light wave to an obstacle and receive a sound wave or a light wave reflected off the obstacle. A time period from the emitting to the receiving may be acquired and a distance may be calculated according to the time period and a speed of sound or light.

Figure 15:
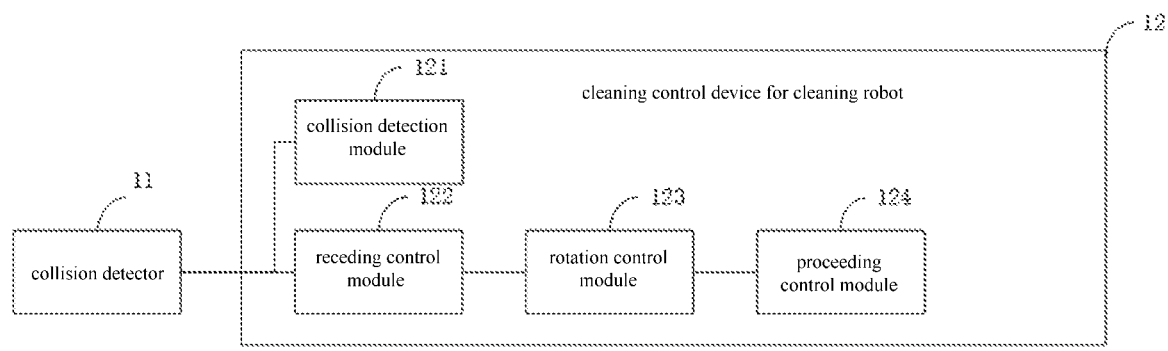
FIG. 15 is a schematic diagram of a cleaning control device for a cleaning robot according to an embodiment of the present disclosure.

In order to realize the above cleaning control method for a cleaning robot, the present disclosure provides a cleaning control device 12 for a cleaning robot. FIG. 15 is a schematic diagram of a cleaning control device for a cleaning robot according to an embodiment of the present disclosure. In one embodiment, the cleaning robot is provided with a collision detector 11 configured to detect an obstacle and connected to the cleaning control device 12.

In one embodiment, the cleaning control device 12 includes:

a collision detection module 121, configured to control the cleaning robot to proceed and trigger the collision detector 11 disposed at the cleaning robot to emit a trigger signal;

a receding control module 122, configured to control the cleaning robot to recede a first distance according to the trigger signal;

a rotation control module 123, configured to control the cleaning robot to rotate in place so that a proceeding direction of the cleaning robot is in parallel with a contour line of an obstacle or a tangent thereof; and a proceeding control module 124, configured to control the cleaning robot to proceed according to the proceeding direction, and control a distance between the cleaning robot and the obstacle to be maintained within a preset distance range during proceeding.

In an embodiment, that the collision detector 11 includes a first collision detector 111 disposed at a foremost end of the cleaning robot. The cleaning robot is further provided with a first distance detector and a second distance detector symmetrically at two sides of the cleaning robot. At this time, the rotation control module 123 is configured to:

control the cleaning robot to take a current position as an initial position and to rotate in place according to a preset direction, the preset direction including a counter-clockwise direction and a clockwise direction;

control the first distance detector and the second distance detector to detect at the same time during rotation so that the first distance detector or the second distance detector acquires a second distance between the cleaning robot and the obstacle; and determine the proceeding direction of the cleaning robot according to the second distance.

In an embodiment, the collision detector 11 further includes a second collision detector 112 and a third collision detector 113, which are disposed symmetrically at the two sides of the cleaning robot. The first distance detector and the second collision detector 112 are disposed at one side of the cleaning robot, and the second distance detector and the third collision detector 113 are disposed at the other side of the cleaning robot. At this time, the rotation control module 123 is configured to:

identify a target collision detector 11 that detects the collision, the target collision detector 11 being one of the first collision detector 111, the second collision detector 112 and the third collision detector 113;

determine a rotation direction of the cleaning robot according to a mounting position of the target collision detector 11 at the cleaning robot;

control a target distance detector 11 disposed at the same side of the cleaning robot as the target collision detector to acquire the second distance between the cleaning robot and the obstacle during rotation of the cleaning robot; and determine the proceeding direction of the cleaning robot according to the second distance.

In an embodiment, the collision detector 11 includes a second collision detector 112 and a third collision detector 113, which are disposed symmetrically at the two sides of the cleaning robot. The first distance detector and the second collision detector 112 are disposed at one side of the cleaning robot, and the second distance detector and the third collision detector 113 are disposed at the other side of the cleaning robot. At this time, the rotation control module 123 is configured to:

identify a target collision detector 11 that detects the collision, the target collision detector 11 being one of the second collision detector 112 and the third collision detector 113;

determine a rotation direction of the cleaning robot according to a mounting position of the target collision detector 11 at the cleaning robot;

control a target distance detector 11 disposed at the same side of the cleaning robot as the target collision detector to acquire a second distance between the cleaning robot and the obstacle during rotation of the cleaning robot; and determine the proceeding direction of the cleaning robot according to the second distance.

The rotation control module 123 is further configured to:

identify a minimum second distance and determine a first rotation angle currently required for the cleaning robot according to the minimum second distance; and control the cleaning robot to rotate according to the first rotation angle, to obtain the proceeding direction of the cleaning robot.

The rotation control module 123 is further configured to:

acquire a first time when the minimum second distance is identified;

acquire a time difference between a current time and the first time, and acquire, according to the time difference and a rotation speed of the cleaning robot, a second rotation angle that the cleaning robot has rotated for a time period from the first time to the current time; and acquire, according to the first rotation angle and the second rotation angle, a third rotation angle remained for the cleaning robot, and control the cleaning robot to continue to rotate the third rotation angle, to obtain the proceeding direction of the cleaning robot.

The proceeding control module 124 is further configured to:

acquire a third distance between the target distance detector and the obstacle at the moment, the target distance detector being one of the first distance detector and the second distance detector;

control the cleaning robot to continue proceeding, and acquire a current distance between the target distance detector and the obstacle in real time; and adjust the proceeding direction of the cleaning robot according to the current distance, so that the distance between the cleaning robot and the obstacle is maintained within the pre-set distance range, where the pre-set distance range includes the third distance.

The proceeding control module 124 is further configured to:

compare the current distance with the third distance;

determine that the proceeding direction of the cleaning robot is proceeding away from the contour line or the tangent thereof, when it is compared that the current distance is greater than the third distance;

determine that the proceeding direction of the cleaning robot is approaching the contour line or the tangent thereof, when it is compared that the current distance is smaller than the third distance; and control the cleaning robot to rotate in an inverse direction according to a difference between the current distance and the third distance.

In one embodiment, the collision detector 11 is an infrared sensor or an ultrasonic sensor.

With the cleaning control device 12 for a cleaning robot provided in the embodiments of the present disclosure, by controlling the cleaning robot to recede a distance after one collision with the obstacle, adjusting the cleaning robot to rotate so that the proceeding direction of the cleaning robot is in parallel with the contour line of the obstacle or a tangent thereof, and maintaining the distance between the cleaning robot and the obstacle during proceeding, the number of collisions of the cleaning robot with the obstacle during working is reduced, and an efficient and automatic function of cleaning along contour line is realized for the cleaning robot, thus improving the cleaning control method for the cleaning robot.

Figure 16:
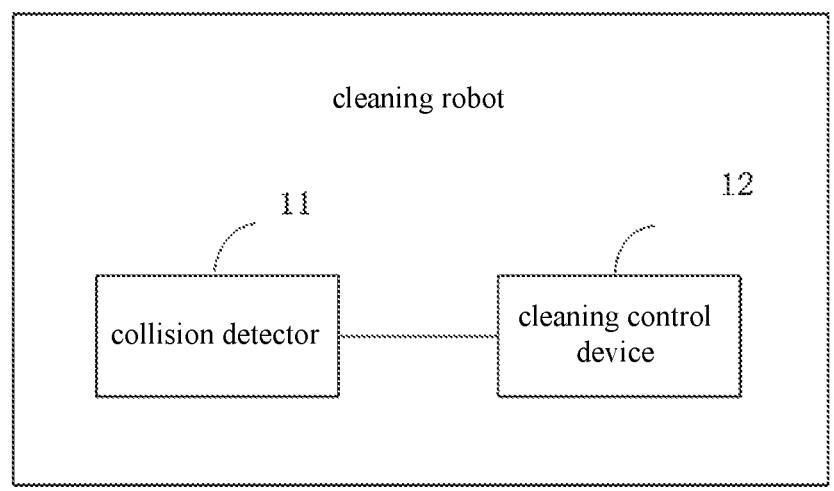
FIG. 16 is a schematic diagram of a cleaning robot according to an embodiment of the present disclosure.

In order to realize the above embodiments, the present disclosure provides a cleaning robot. FIG. 16 is a schematic diagram of a cleaning robot according to an embodiment of the present disclosure. As shown in FIG. 16, a collision detector 11 is disposed at the cleaning robot and configured to detect an obstacle, and the cleaning robot also provided with a cleaning control device 12 as described in the embodiments of the second aspect of the present disclosure, the collision detector 11 is connected to the cleaning control device 12.

With the cleaning robot provided in the embodiments of the present disclosure, by controlling the cleaning robot to recede a distance after one collision with the obstacle, adjusting the cleaning robot to rotate so that the proceeding direction of the cleaning robot is in parallel with the contour line of the obstacle or a tangent thereof, and maintaining the distance between the cleaning robot and the obstacle during proceeding, the number of collisions of the cleaning robot with the obstacle during working is reduced, and an efficient and automatic function of cleaning along contour line is realized for the cleaning robot, thus improving the cleaning control method for the cleaning robot.

Figure 17:
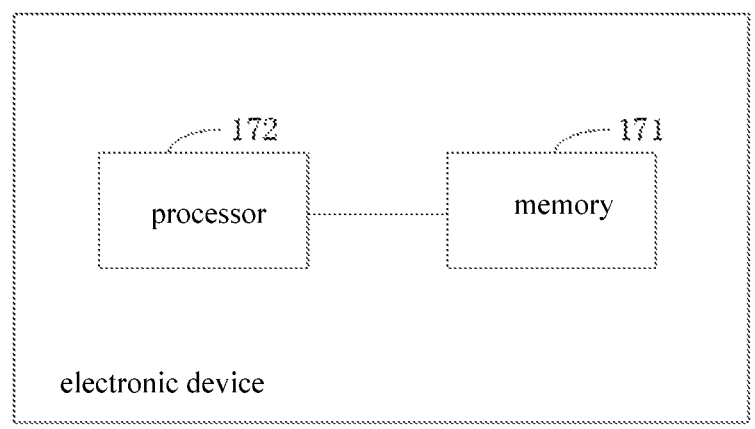
FIG. 17 is a schematic diagram of an electronic device according to an embodiment of the present disclosure.

In order to realize the above embodiments, the present disclosure provides an electronic device. FIG. 17 is a schematic diagram of an electronic device according to an embodiment of the present disclosure. As shown in FIG. 17, the electronic device includes a processor 171 and a memory 172.

In one embodiment, the processor 172 reads an executable program code stored in the memory 171 to execute a program corresponding to the executable program code, to perform a cleaning control method for a cleaning robot as described in the above embodiments of the present disclosure.

In order to realize the above embodiments, the present disclosure provides a non-transitory computer readable storage medium having stored therein a computer program that, when executed by a processor, causes the processor to perform a cleaning control method for a cleaning robot as described in the above embodiments of the present disclosure.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise", "counter-clockwise", "axial", "radial" and "circumferential" should be construed to refer to the orientation as then described or as shown in the drawings under discussion. These relative terms are for convenience of description and do not require that the present disclosure be constructed or operated in a particular orientation, and thus shall not be construed to limit the present disclosure.

In addition, terms such as "first" and "second" are used herein for purposes of description and are not intended to indicate or imply relative importance or significance or to imply the number of indicated embodiments. Thus, the feature defined with "first" and "second" may include one or more of this feature. In the description of the present disclosure, unless specified otherwise, "a plurality of" means two or more than two.

In the present disclosure, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications of two elements.

In the description, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed there between. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. Thus, the appearances of above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples described in the specification, as well as features of embodiments or examples.

What is claimed is:

1. A cleaning control method for a cleaning robot, comprising:
   controlling the cleaning robot to proceed and triggering a collision detector disposed at the cleaning robot to emit a trigger signal;
   controlling the cleaning robot to recede a first distance according to the trigger signal;
   controlling the cleaning robot to rotate in place so that a proceeding direction of the cleaning robot is in parallel with a contour line of an obstacle or a tangent thereof; and
   controlling the cleaning robot to proceed according to the proceeding direction, and controlling a distance between the cleaning robot and the obstacle to be maintained within a pre-set distance range during proceeding.

2. The cleaning control method according to claim 1,
   wherein the collision detector comprises a first collision detector disposed at a foremost end of the cleaning robot,
   wherein the cleaning robot is further provided with a first distance detector and a second distance detector symmetrically at two sides of the cleaning robot, and
   wherein controlling the cleaning robot to rotate in place, wherein a proceeding direction of the cleaning robot is in parallel with a contour line of an obstacle or a tangent thereof comprises:
   controlling the cleaning robot to take a current position as an initial position and to rotate in place according to a pre-set direction, the pre-set direction comprising a counter-clockwise direction and a clockwise direction;
   controlling the first distance detector and the second distance detector to detect at the same time during rotation, wherein the first distance detector or the second distance detector acquires a second distance between the cleaning robot and the obstacle; and
   determining the proceeding direction of the cleaning robot according to the second distance.

3. The cleaning control method according to claim 2,
   wherein the collision detector further comprises a second collision detector and a third collision detector, which are disposed symmetrically at the two sides of the cleaning robot,
   wherein the first distance detector and the second collision detector are disposed at one side of the cleaning robot, and the second distance detector and the third collision detector are disposed at the other side of the cleaning robot, and wherein controlling the cleaning robot to rotate in place, and wherein a proceeding direction of the cleaning robot is in parallel with a contour line of an obstacle or a tangent thereof comprises:

identifying a target collision detector that detects a collision, the target collision detector being one of the first collision detector, the second collision detector and the third collision detector;

determining a rotation direction of the cleaning robot according to a mounting position of the target collision detector at the cleaning robot;

controlling a target distance detector disposed at the same side of the cleaning robot as the target collision detector to acquire the second distance between the cleaning robot and the obstacle during rotation of the cleaning robot; and determining the proceeding direction of the cleaning robot according to the second distance.

4. The cleaning control method according to claim 1, wherein the collision detector comprises a second collision detector and a third collision detector, which are disposed symmetrically at the two sides of the cleaning robot, wherein a first distance detector and the second collision detector are disposed at one side of the cleaning robot, and a second distance detector and the third collision detector are disposed at the other side of the cleaning robot, and wherein controlling the cleaning robot to rotate in place, wherein a proceeding direction of the cleaning robot is in parallel with a contour line of an obstacle or a tangent thereof comprises:

identifying a target collision detector that detects a collision, the target collision detector being one of the second collision detector and the third collision detector;

determining a rotation direction of the cleaning robot according to a mounting position of the target collision detector at the cleaning robot;

controlling a target distance detector disposed at the same side of the cleaning robot as the target collision detector to acquire a second distance between the cleaning robot and the obstacle during rotation of the cleaning robot; and determining the proceeding direction of the cleaning robot according to the second distance.

5. The cleaning control method according to claim 2, wherein determining the proceeding direction of the cleaning robot according to the second distance comprises:

identifying a minimum second distance, and determining a first rotation angle currently required for the cleaning robot according to the minimum second distance; and controlling the cleaning robot to rotate according to the first rotation angle, obtain the proceeding direction of the cleaning robot.

6. The cleaning control method according to claim 5, wherein controlling the cleaning robot to rotate according to the first rotation angle, to determine the proceeding direction of the cleaning robot comprises:

acquiring a first time when the minimum second distance is identified;

acquiring a time difference between a current time and the first time, and acquiring, according to the time difference and a rotation speed of the cleaning robot, a second rotation angle that the cleaning robot has rotated for a time period from the first time to the current time; and acquiring, according to the first rotation angle and the second rotation angle, a third rotation angle remained for the cleaning robot, and controlling the cleaning robot to continue to rotate the third rotation angle, to obtain the proceeding direction of the cleaning robot.

7. The cleaning control method according to claim 6, wherein controlling a distance between the cleaning robot and the obstacle to be maintained within a pre-set distance range during proceeding comprises:

acquiring a third distance between a target distance detector and the obstacle, the target distance detector being one of the first distance detector and the second distance detector;

controlling the cleaning robot to continue proceeding, and acquiring a current distance between the target distance detector and the obstacle in real time; and adjusting the proceeding direction of the cleaning robot according to the current distance, wherein the distance between the cleaning robot and the obstacle is maintained within the pre-set distance range, wherein the pre-set distance range comprises the third distance.

8. The cleaning control method according to claim 7, wherein adjusting the proceeding direction of the cleaning robot according to the current distance comprises:

comparing the current distance with the third distance;

determining that the proceeding direction of the cleaning robot is proceeding away from the contour line or the tangent thereof, when it is compared that the current distance is greater than the third distance;

determining that the proceeding direction of the cleaning robot is approaching the contour line or the tangent thereof, when it is compared that the current distance is smaller than the third distance; and controlling the cleaning robot to rotate in an inverse direction according to a difference between the current distance and the third distance.

9. The cleaning control method according to claim 1, wherein the collision detector is an infrared sensor or an ultrasonic sensor.

10. A cleaning control device for a cleaning robot, wherein the cleaning robot is provided with a collision detector configured to detect an obstacle and connected to the cleaning control device, wherein the cleaning control device comprises:

a collision detection module, configured to control the cleaning robot to proceed and trigger the collision detector disposed at the cleaning robot to emit a trigger signal;

a receding control module, configured to control the cleaning robot to recede a first distance according to the trigger signal;

a rotation control module, configured to control the cleaning robot to rotate in place, wherein a proceeding direction of the cleaning robot is in parallel with a contour line of an obstacle or a tangent thereof; and a proceeding control module, configured to control the cleaning robot to proceed according to the proceeding direction, and control a distance between the cleaning robot and the obstacle to be maintained within a pre-set distance range during proceeding.

11. The cleaning control device for a cleaning robot according to claim 10, wherein the collision detector comprises a first collision detector disposed at a foremost end of the cleaning robot, wherein the cleaning robot is further provided with a first distance detector and a second distance detector symmetrically at two sides of the cleaning robot, and wherein the rotation control module is configured to control the cleaning robot to take a current position as an initial position and to rotate in place according to a pre-set direction, the pre-set direction comprising a counter-clockwise direction and a clockwise direction;

control the first distance detector and the second distance detector to detect at the same time during rotation, wherein the first distance detector or the second distance detector acquires a second distance between the cleaning robot and the obstacle; and determine the proceeding direction of the cleaning robot according to the second distance.

12. The cleaning control device for a cleaning robot according to claim 11, wherein the collision detector further comprises a second collision detector and a third collision detector, which are disposed symmetrically at the two sides of the cleaning robot, wherein the first distance detector and the second collision detector are disposed at one side of the cleaning robot, and the second distance detector and the third collision detector are disposed at the other side of the cleaning robot, and wherein the rotation control module is configured to identify a target collision detector that detects a collision, the target collision detector being one of the first collision detector, the second collision detector and the third collision detector;

determine a rotation direction of the cleaning robot according to a mounting position of the target collision detector at the cleaning robot;

control a target distance detector disposed at the same side of the cleaning robot as the target collision detector to acquire the second distance between the cleaning robot and the obstacle during rotation of the cleaning robot; and determine the proceeding direction of the cleaning robot according to the second distance.

13. The cleaning control device for a cleaning robot according to claim 10, wherein the collision detector comprises a second collision detector and a third collision detector, which are disposed symmetrically at two sides of the cleaning robot, wherein a first distance detector and the second collision detector are disposed at one side of the cleaning robot, and the second distance detector and the third collision detector are disposed at the other side of the cleaning robot, and wherein the rotation control module is configured to identify a target collision detector that detects a collision, the target collision detector being one of the second collision detector and the third collision detector;

determine a rotation direction of the cleaning robot according to a mounting position of the target collision detector at the cleaning robot;

control a target distance detector disposed at the same side of the cleaning robot as the target collision detector to acquire a second distance between the cleaning robot and the obstacle during rotation of the cleaning robot; and determine the proceeding direction of the cleaning robot according to the second distance.

14. The cleaning control device for a cleaning robot according to claim 11, wherein the rotation control module is further configured to identify a minimum second distance and determine a first rotation angle currently required for the cleaning robot according to the minimum second distance; and control the cleaning robot to rotate according to the first rotation angle, to obtain the proceeding direction of the cleaning robot.

15. The cleaning control device for a cleaning robot according to claim 14, wherein the rotation control module is further configured to acquire a first time when the minimum second distance is identified;

acquire a time difference between a current time and the first time, and acquire, according to the time difference and a rotation speed of the cleaning robot, a second rotation angle that the cleaning robot has rotated for a time period from the first time to the current time; and acquire, according to the first rotation angle and the second rotation angle, a third rotation angle remained for the cleaning robot, and control the cleaning robot to continue to rotate the third rotation angle, to obtain the proceeding direction of the cleaning robot.

16. The cleaning control device for a cleaning robot according to claim 15, wherein the proceeding control module is further configured to acquire a third distance between a target distance detector and the obstacle, the target distance detector being one of the first distance detector and the second distance detector;

control the cleaning robot to continue proceeding, and acquire a current distance between the target distance detector and the obstacle in real time; and adjust the proceeding direction of the cleaning robot according to the current distance, wherein the distance between the cleaning robot and the obstacle is maintained within the pre-set distance range, wherein the distance range comprises the third distance.

17. The cleaning control device for a cleaning robot according to claim 16, wherein the proceeding control module is further configured to compare the current distance with the third distance;

determine that the proceeding direction of the cleaning robot is proceeding away from the contour line or the tangent thereof, when it is compared that the current distance is greater than the third distance;

determine that the proceeding direction of the cleaning robot is approaching the contour line or the tangent thereof, when it is compared that the current distance is smaller than the third distance; and control the cleaning robot to rotate in an inverse direction according to a difference between the current distance and the third distance.

18. The cleaning control device for a cleaning robot according to claim 10, wherein the collision detector is an infrared sensor or an ultrasonic sensor.

19. A cleaning robot, comprising:
a collision detector disposed at the cleaning robot and configured to detect an obstacle; and
a cleaning control device according to claim 10, which is connected to the collision detector.

20. An electronic device, comprising:
a memory,
a processor;

wherein the processor reads an executable program code stored in the memory to execute a program corresponding to the executable program code, to perform a cleaning control method for a cleaning robot according to claim 1.

21. A non-transitory computer-readable storage medium having stored therein computer programs that, when executed by a processor, cause a cleaning control method for a cleaning robot according to claim 1 to be performed.

* * * * *